United States Patent
Barber et al.

(10) Patent No.: US 12,147,874 B2
(45) Date of Patent: Nov. 19, 2024

(54) QUANTUM ERROR CORRECTION CODE DECODER AND ASSOCIATED METHODS

(71) Applicant: RIVERLANE LTD, Cambridge (GB)

(72) Inventors: Ben Andrew Barber, Cambridge (GB); Kenton Michael Barnes, Cambridge (GB); Kauser Yakub Johar, Cambridge (GB); Luka Skoric, Cambridge (GB)

(73) Assignee: RIVERLANE LTD, Cambridge (GB)

( * ) Notice: Subject to any disclaimer, the term of this patent is extended or adjusted under 35 U.S.C. 154(b) by 0 days.

(21) Appl. No.: 18/055,529

(22) Filed: Nov. 15, 2022

(65) Prior Publication Data

US 2024/0160988 A1     May 16, 2024

(51) Int. Cl.
 *G06F 11/30* (2006.01)
 *G06F 11/00* (2006.01)
 *G06N 10/70* (2022.01)

(52) U.S. Cl.
 CPC .................................. *G06N 10/70* (2022.01)

(58) Field of Classification Search
 CPC ........ G06N 10/70; G06N 10/20; G06N 10/40; G06N 10/00; G06N 5/01; G11C 29/52
 See application file for complete search history.

(56) References Cited

U.S. PATENT DOCUMENTS

| 11,901,915 B1 * | 2/2024 | Campbell | H03M 13/159 |
| 2021/0042650 A1 | 2/2021 | Das et al. | |
| 2021/0124640 A1 | 4/2021 | Nickerson et al. | |
| 2022/0198311 A1 * | 6/2022 | Delfosse | G06N 10/00 |
| 2022/0216884 A1 | 7/2022 | Delfosse et al. | |

(Continued)

FOREIGN PATENT DOCUMENTS

| WO | 2019002934 A1 | 1/2019 |
| WO | 2022150079 A1 | 7/2022 |

OTHER PUBLICATIONS

U.S. Appl. No. 18/055,488, filed Nov. 15, 2022, Titled: Quantum Error Correction Code Decoder and Associated Methods, 31 pgs.

(Continued)

*Primary Examiner* — Christine T. Tu
(74) *Attorney, Agent, or Firm* — MASCHOFF BRENNAN

(57) ABSTRACT

A decoder apparatus for decoding syndromes of a quantum error correction code, the syndromes comprising measurement data from a quantum computer, the quantum computer comprising an array of qubits including syndrome qubits and data qubits. The decoder apparatus is configured to: receive syndrome index data representative of: a physical location of each of the array of qubits within the quantum computer; and lattice dimensions of the array of qubits; receive the syndromes of the quantum error correction code from the quantum computer; determine physical co-ordinate positions for each of the array of qubits based on the syndrome index data; decode the syndromes of the quantum error correction code using the determined physical co-ordinate positions. The decoder apparatus has a first syndrome capacity for decoding quantum error correction code syndromes and the syndromes of the quantum error correction code occupy a second syndrome capacity less than or equal to the first syndrome capacity of the decoder apparatus.

18 Claims, 14 Drawing Sheets

(56) References Cited

U.S. PATENT DOCUMENTS

2022/0269963 A1* 8/2022 Delfosse ............ G06F 16/9024

OTHER PUBLICATIONS

International Search Report and Written Opinion for International Application No. PCT/GB2023/051972 mailed Oct. 9, 2023.
International Search Report and Written Opinion for International Application No. PCT/GB2023/051971 mailed Oct. 12, 2023.
Xinyu Tan et al: "Scalable surface code decoders with parallelization in time", arxiv.org, Cornell University Library, 201 Olin Library Cornell University Ithaca, NY 14853, Sep. 19, 2022 (23 Pages).
Shilin Huang et al: "Fault-Tolerant Weighted Union-Find Decoding on the Torie Code", arxiv.org, Cornell University Library, 201 Olin Library Cornell University Ithaca, NY 14853 Apr. 9, 2020 (6 Pages).
Nicolas Delfosse et al: "Almost-linear time decoding algorithm for topological codes", arxiv.org, Cornell University Library, 201 Olin Library Cornell University Ithaca, NY 14853, Nov. 23, 2021 (12 Pages).
Das Poulami et al: "AFS: Accurate, Fast, and Scalable Error-Decoding for Fault-Tolerant Quantum Computers", 2022 IEEE International Symposium on High-Performance Computer Architecture (HPCA), IEEE, Apr. 2, 2022 (15 Pages).
UK Search report mailed May 17, 2024 in GB2310012.6.
UK Search report mailed May 17, 2024 in GB2309996.3.

* cited by examiner

QUANTUM ERROR CORRECTION CODE DECODER AND ASSOCIATED METHODS

BACKGROUND

The present disclosure relates to apparatus, systems, methods and data structures for use in decoding quantum error correction codes.

SUMMARY

According to a first aspect there is provided a decoder apparatus for decoding syndromes of a quantum error correction code, the syndromes comprising measurement data from a quantum computer, the quantum computer comprising an array of qubits including syndrome qubits and data qubits, the decoder apparatus configured to:
receive syndrome index data representative of:
a physical location of each of the array of qubits within the quantum computer; and
lattice dimensions of the array of qubits;
receive the syndromes of the quantum error correction code from the quantum computer;
determine physical co-ordinate positions for each of the array of qubits based on the syndrome index data;
decode the syndromes of the quantum error correction code using the determined physical co-ordinate positions; and
wherein:
the decoder apparatus has a first syndrome capacity for decoding quantum error correction code syndromes; and
the syndromes of the quantum error correction code occupy a second syndrome capacity less than or equal to the first syndrome capacity of the decoder apparatus.

Optionally, the array of qubits may be rectilinear.

Optionally, the syndrome index data may comprise: a syndrome index list including a series of index values, one unique index value for each respective syndrome qubit of the array.

Optionally, the syndrome index data may comprise lattice dimensions comprising a first value for a first lattice dimension and a second value for a second lattice dimension, wherein the first lattice dimension may be orthogonal to the second lattice dimension.

Optionally, the array may be rectangular and the processor may be configured to determine the physical co-ordinate positions by:
determining a first co-ordinate value for each respective syndrome qubit, corresponding to the first lattice dimension, by computing a sum of one and the respective index value modulo a difference between the second value and one; and
determining a second co-ordinate value for each respective syndrome qubit, correspond to the second lattice dimension, by computing an integer quotient of the respective index value divided by the difference between the second value and one.

Optionally, the quantum error correction code may be a planar surface code.

Optionally, the lattice dimensions may comprise a third value for a third lattice dimension orthogonal to both the first lattice dimension and the second lattice dimension.

Optionally, the syndromes of the quantum error correction code may comprise a plurality of rounds of error correction.

Optionally, the syndrome index data may comprise a plurality of different respective lattice dimensions for different respective sets of rounds of the plurality of rounds of error correction.

Optionally, the processor may be configured to set decoder edges to a weight value of zero for a first region bounding a second region, the second region corresponding to dimensions of the syndromes of the quantum error correction code.

Optionally, the processor may be configured to:
process the syndromes to identify defects;
record, in a data structure, respective locations for each defect; and
determine a respective radius, for each respective defect, of a ball surrounding the respective location of the respective defect, and record each respective radius with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of the defects;
wherein the data structure thereby enables decoding of the quantum error correction code.

Optionally, when at a particular iteration an odd number of the locations join a pre-existing cluster consisting of an even number of locations thereby forming a new cluster, at the next iteration the processor may be configured to increase the length of each radius of the new cluster.

Optionally, the length of a particular radius may be determined based on a number of times that the particular radius has been incrementally increased.

Optionally, the plurality of syndrome qubits may form a physical array with locations of the plurality of syndrome qubits corresponding to respective positions of the plurality of syndrome qubits in a graph representation of the array.

Optionally, each iterative increase in the length of the respective radius may be an increase of half the graph length between nearest neighbor locations of the graph.

Optionally, the touching or overlapping of the ball with the other ball may be determined based on the sum of the radius length of the ball and the radius length of the other ball being at least equal to the graph distance between the ball and the other ball.

Optionally, the processor may be further configured to decode each of the one or more clusters to determine the location and type of error present on each data qubit containing an error.

Optionally, the processor may be further configured to perform error correction for each data qubit containing an error.

Optionally, there may be provided a quantum computer system comprising any decoder apparatus disclosed herein, the quantum computer system configured to decode the one or more clusters and to perform quantum error correction.

According to a further aspect there is provided a computer-implemented method for decoding syndromes of a quantum error correction code, the syndromes comprising measurement data from a quantum computer, the quantum computer comprising an array of qubits including syndrome qubits and data qubits, the method comprising:
receiving syndrome index data representative of:
a physical location of each of the array of qubits within the quantum computer; and
lattice dimensions of the array of qubits;

receiving the syndromes of the quantum error correction code from the quantum computer;

determining physical co-ordinate positions for each of the array of qubits based on the syndrome index data;

decoding the syndromes of the quantum error correction code using the determined physical co-ordinate positions; and wherein the syndromes of the quantum error correction code occupy a second syndrome capacity less than or equal to a first syndrome capacity for decoding quantum error correction code syndromes.

According to a further aspect there is provided a computer program product comprising instructions, which, when executed by any decoder apparatus disclosed herein, performs any method disclosed herein.

BRIEF DESCRIPTION OF THE DRAWINGS

Examples of the present invention will now be described in detail with reference to the accompanying drawings, in which.

DETAILED DESCRIPTION

Quickly decoding the syndrome data required for quantum error correction is one of the limiting factors for achieving fault tolerant quantum computation, and hardware decoders will be essential to achieve the necessary scale. The decoding problem is typically based on square and cubic grids, the dimensions of which can vary. This disclosure presents a hardware system for decoding that can be reconfigured to work on grids of arbitrary dimensions, up to some maximum total size. Advantageously, the same hardware decoder can therefore be used in conjunction with different quantum computers with different dimensions of qubit array and can also be used with different numbers and/or arrangements of qubits for performing different computations with the same quantum computer, where different levels of error correction are appropriate.

A quantum processor unit can contain a combination of data qubits, used to store and manipulate the quantum information, and syndrome qubits that can be used to determine the presence or absence of errors that occur on the data qubits at any time, including during quantum data processing, and also measurement errors that occur during the syndrome qubit measurement process. Measurement of these syndrome qubits can generate a very large (potentially Terabytes per-second), real-time, flow of error correction data that needs to be processed to make quantum computing possible.

The data attained from measuring syndrome qubits is called the 'syndrome'. The process of decoding includes using the syndrome to determine which data qubits have been affected by errors and what types of error. Only then, is it possible to implement the necessary error corrections required for fault tolerant quantum computing. Decoding is therefore a critical process required to make practical quantum computing technically possible.

Decoders that work by grouping syndrome bits into clusters, such as "Union-Find", are one of the leading proposals for fast and scalable decoders. There exist implementation proposals for these "clustering" decoders in dedicated hardware, in order to decode in real-time at the very high speeds required.

In the following disclosure, the surface code will be used to provide specific examples of a quantum error correction code. However, it will be appreciated that many other types of quantum error correction code are possible, such as other topological quantum codes, bosonic codes, etc., which may also advantageously be decoded using methods and apparatus as disclosed herein.

Figure 1:
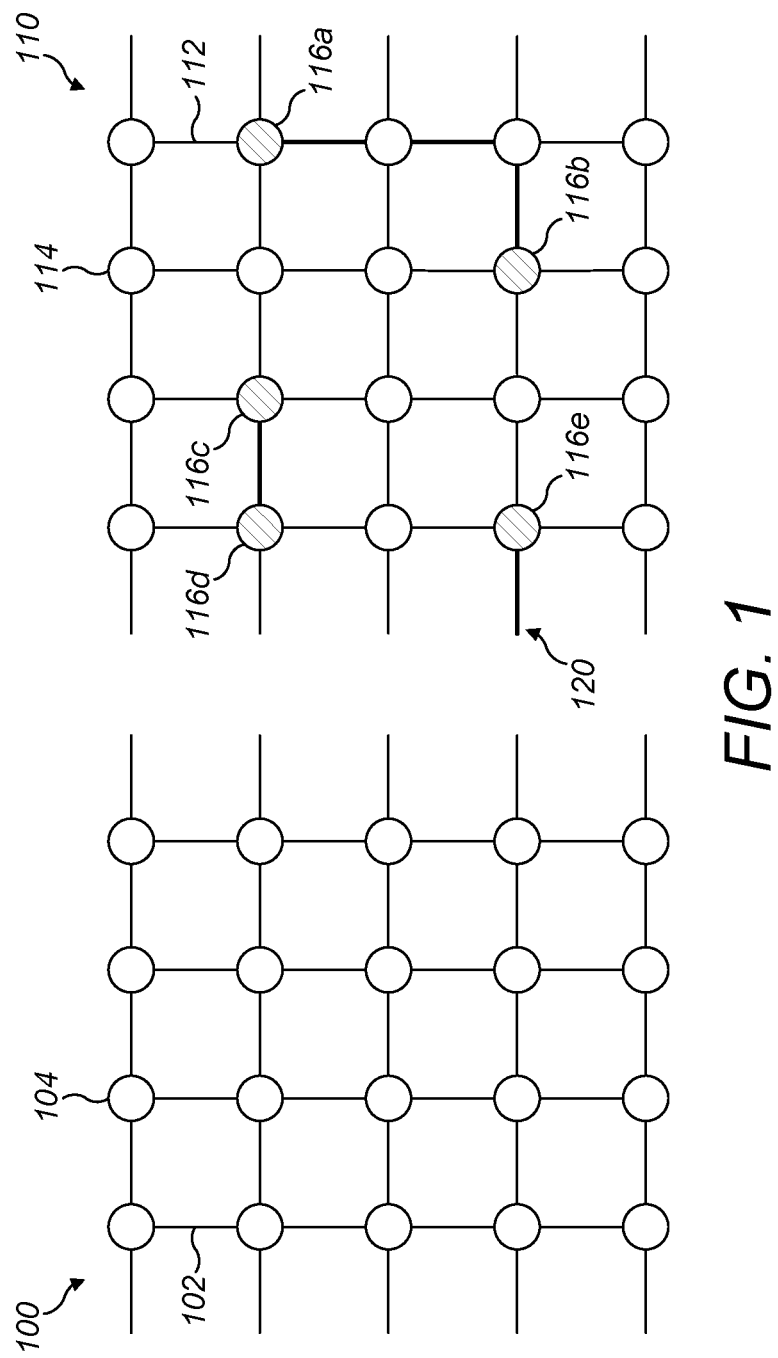
FIG. 1 shows an example of patches of surface code.

FIG. 1 shows two examples of surface code patches 100, 110 represented as graphs. Surface code decoding is a graph problem. Edges 102, 112 correspond to data qubits. Vertices 104, 114 correspond to syndrome measurement qubits. With no errors, syndrome qubits are in the $|0\rangle$ state, as illustrated in the first surface code patch 100. An error on a data qubit edge flips the states of its endpoints from $|0\rangle$ to $|1\rangle$, or vice-versa. The end result is that syndrome measurement vertices are $|1\rangle$ if there are an odd number of errors on the incident data qubit edges, and $|0\rangle$ otherwise. The second surface code patch 110 shows five vertices 116a-e in the $|1\rangle$ state.

Syndrome measurement vertices with the value $|1\rangle$ may be referred to as error syndrome bits, which can arise where they are adjacent to an odd number of data qubits on which an errors are present. The syndrome measurement data can be processed to identify defects in the syndromes associated with physical qubits that have the $|1\rangle$ value associated with them that indicates that an error has occurred somewhere in the system.

The description of error correction presented immediately above involves a perfect set of stabiliser measurements, decoding of the resulting syndrome, then physical correction of the determined Pauli errors. However, it will be appreciated by person skilled in the art that this describes a somewhat idealized picture and that error correction in practice can involve further subtleties as discussed below.

The reality of error correction can differ in that (i) measurements are not perfect, and (relatedly) (ii) that typically physically correcting errors after every round (if at all)

is not necessarily required. This means that an error which flips the result of some stabiliser measurements will continue to flip the results of those measurements in subsequent measurement rounds. Decoding the resulting syndrome would result in a whole sequence of errors in the same place, repeating across time, which would need to be identified and corrected later. It is more efficient for errors to only affect the syndrome once. This can be achieved elegantly by only reporting differences in the syndrome (often called the difference syndrome which identifies difference syndrome bits). This means that a single data error will appear in only a single time slice of the decoding graph. This also means that a single measurement error will produce changes at two consecutive time steps, the first when the measurement error is made initially and the second when a subsequent correct measurement is made.

This has two delicate consequences. The first is that it is no longer really true that marked/identified vertices correspond to a particular measurement result such as a −1 eigenvalue or a |1⟩ state. In this picture, they represent changes in that measurement from one state to the other. For this reason "|1⟩ vertex" is not necessarily the best name for this idea, when the more complex picture of error correction is considered. A relatively standard name for a marked vertex in a decoding graph is a defect. Errors thus create a pair of defects, and the objective is to match them up. In some examples, an odd number of defects may exist in the code, in which case the matching process can be completed using a so-called 'artificial' defect, which exists at the boundary of the code. It will be appreciated that artificial defects are particular examples of defects.

The second consequence is that time slices of vertices no longer correspond to a time at which measurements were made: vertices are between consecutive rounds of measurement; equivalently, rounds of measurement are between layers of vertices, i.e. are associated with vertical edges of the graph. However, it will be appreciated that embodiments of the present invention can advantageously be applied to both simplified and more complex error correction scenarios. In the latter, more complex scenario, error syndrome bits are examples of difference syndrome bits.

The decoding problem does not generally have a unique solution, therefore the objective is to find the most likely explanation for an observed set of syndrome measurements. An explanation looks like a set of edge-disjoint paths connecting pairs of syndrome vertices that measured |1⟩, as shown in a first example pair 116*a-b* of vertices and a second example pair 116*c-d* of vertices. The most likely explanation is the set of paths with shortest total length. Finding the shortest set of paths connecting pairs of syndrome vertices that measured |1⟩ can be expressed as a minimum weight perfect matching problem, so this approach is known as 'MWPM' decoding.

The edges (data qubits) along the boundary of the surface code are only measured by one syndrome measurement qubit. The other endpoint of these edges is an abstract boundary vertex 120 (the same vertex for every boundary edge) whose state is not measured physically but can be inferred from the requirement that the total number of |1⟩ measurements must be even.

Figure 2:
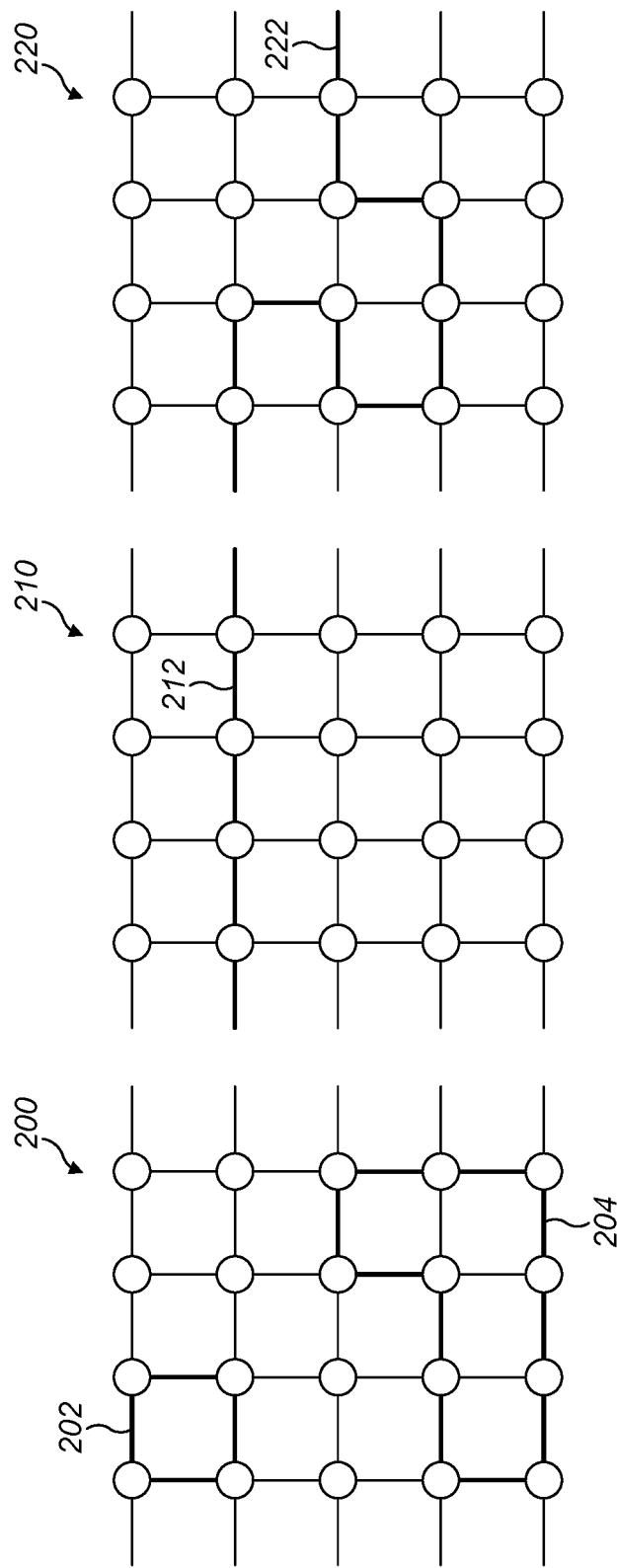
FIG. 2 shows an example of patches of surface code containing errors.

FIG. 2 shows three further surface code patches 200, 210, 220. Some sets of errors are undetectable. A closed loop of errors 202, 204 has an even number of errors at every vertex, so every syndrome qubit will be measured as |0⟩, which would also be consistent with the absence of any errors. These errors are called stabilisers because they are not really errors at all, rather they can be said to fix the state of the data.

A continuous path of errors 212, 222 stretching from the left boundary to the right boundary also has an even number of errors at every measured vertex. These errors are called logical operations, and do affect the state of the data. The number of edges on the shortest path between the boundaries is called the distance of the code, which is 5 in the case of the surface code patches 200, 210, 220 of FIG. 2.

Figure 3:
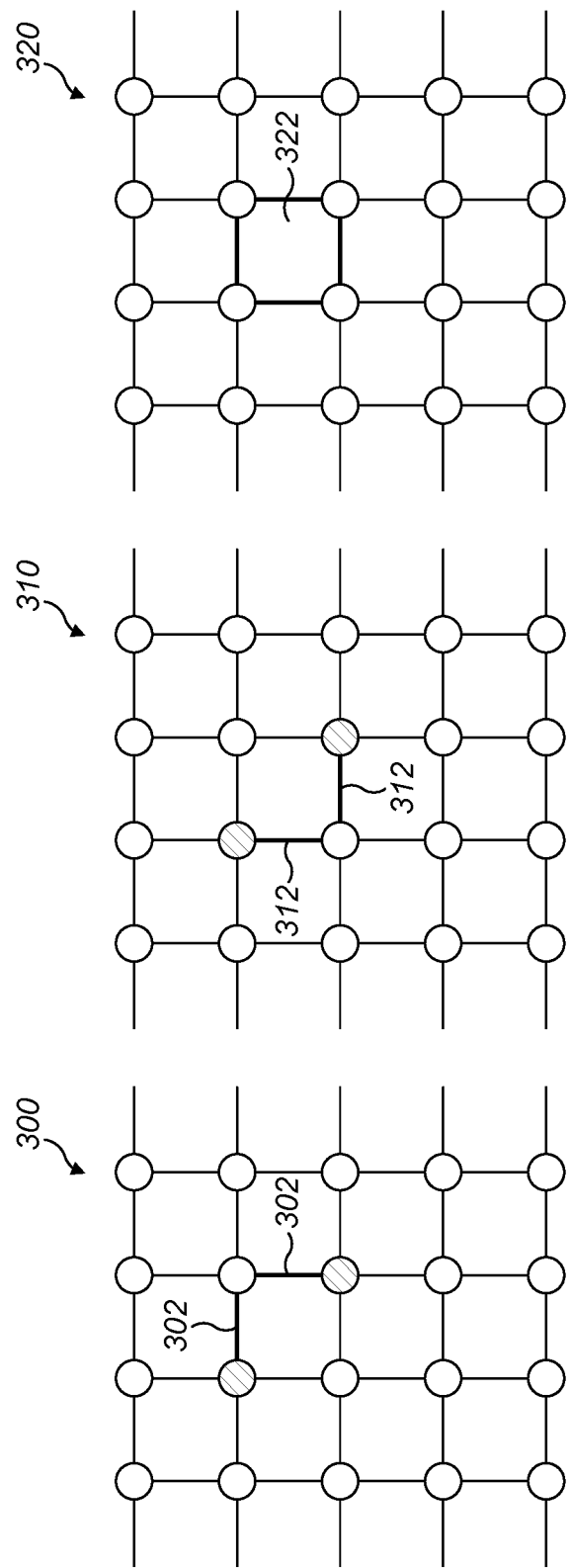
FIG. 3 shows an example of patches of surface code containing equivalent errors.

FIG. 3 shows three surface code patches 300, 310, 320. The existence of stabilisers means that there is not one unique correction for any given error because any two corrections that differ by stabilisers are equivalent. For example, a first interpretation 302 of a pair of |1⟩ vertices is equivalent to a second interpretation 312 of the same pair of |1⟩ vertices, because these interpretations differ by a stabiliser 322. This means that MWPM is not solving exactly the right problem; a perfect decoder would find the most likely explanation of a syndrome where the probabilities of all the equivalent explanations that differ by stabilisers are summed. However, when the physical error rate is small the dominant terms in that sum come from the shortest corrections, so MWPM can provide a good approximation. There are polynomial time algorithms for solving MWPM, but they are too slow to perform decoding in practice, for a real-world quantum computer.

Union-Find is an alternative decoding algorithm that runs in almost linear time (using a so-called "union-find" data structure) and has comparable accuracy to MWPM. The idea of Union-Find is to group |1⟩ vertices into local clusters. How a correction is implemented within a cluster is unimportant, as different choices only differ by stabilisers.

FIGS. 4*a-e* show a series of graphs 410, 420, 430, 440, 450 of unrotated surface code with |1⟩ vertices (illustrated as enlarged crosshatched dots at the relevant vertices) at the same positions for each graph (where each position is given a similar reference numeral in successive graphs). Each graph shows the evolution of a clustering process, conducted according to the Union-Find algorithm, designed to cluster the |1⟩ vertices together into a set of decodable clusters.

Figure 4A:
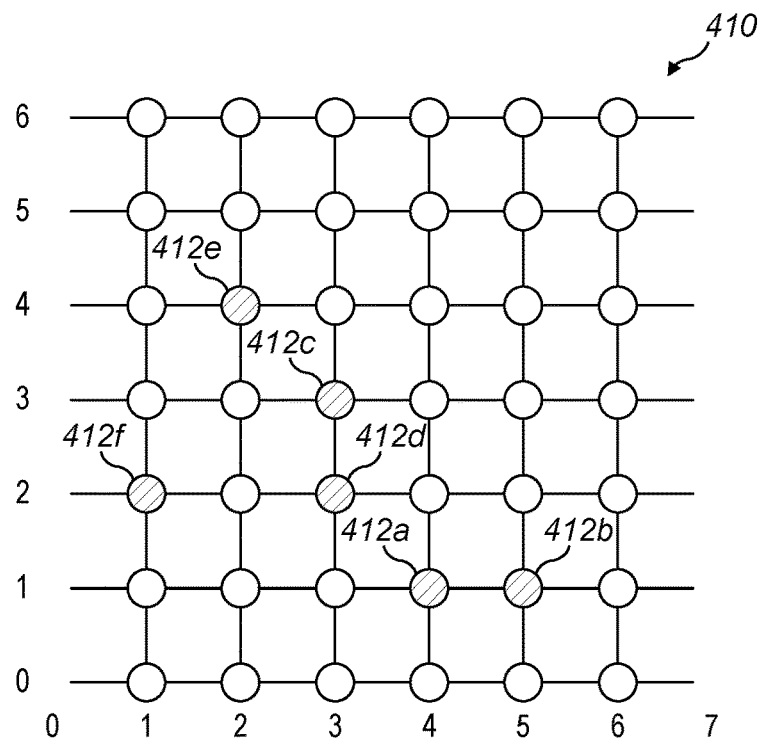
FIGS. 4a-e show an example of a process for decoding a patch of surface code using a Union-Find decoder.

FIG. 4*a* shows a first graph 410. The Union-Find algorithm begins by placing each |1⟩ vertex in its own individual cluster 412*a-f*. For a cluster to be correctable, it needs to contain an even number of |1⟩ vertices. In each iterative round of the process, each cluster containing an odd number of |1⟩ vertices is extended outwards by a half-edge of the graph.

Figure 4B:
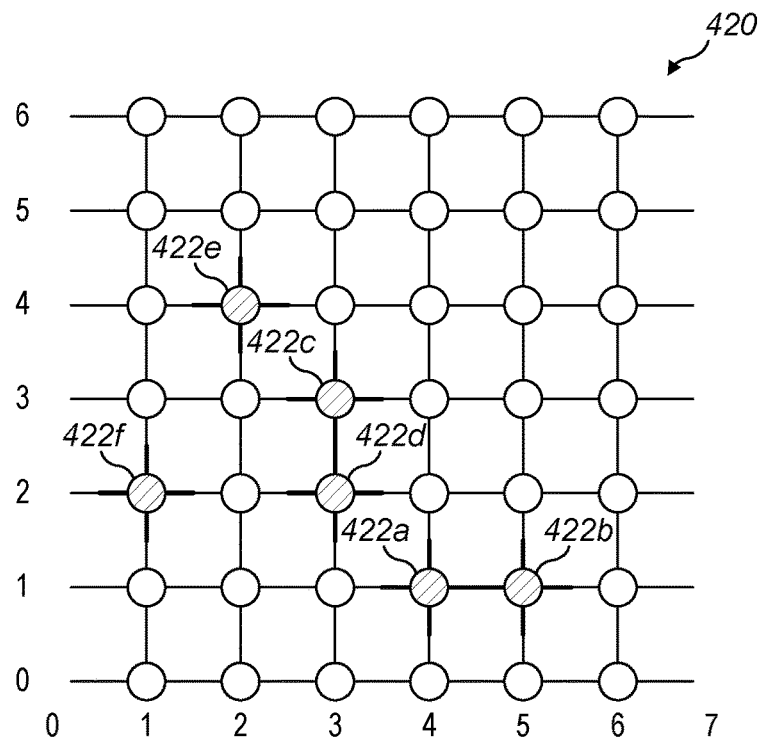

FIG. 4*b* shows a second graph 420, in which the algorithm extends vertices 422*a* and 422*b* by a half-edge in all directions which results in these clusters growing into each other and merging to form a clustered pair of vertices. Similarly, vertices 422*c* and 422*d* merge to form a pair. However, vertices 422*e* and 422*f* remain isolated and thus remain part of cluster containing only the single vertex concerned.

Figure 4C:
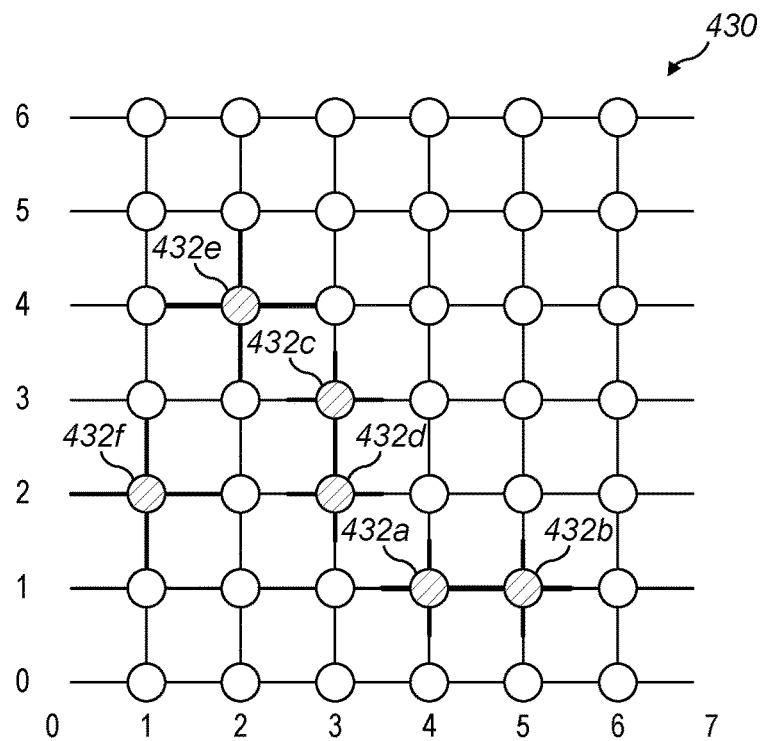

FIG. 4*c* shows a third graph 430 in which the process is repeated, with half-edge growth steps applied to the odd clusters 432*e* and 432*f* to enable clusters to merge until all clusters are even, although, at this step, neither of these vertices 432*e*, 432*f* merge with any others. The even clusters formed at the second graph 420 do not grow in the third graph 430 because they contain an exactly even number of |1⟩ vertices.

The boundary vertex on each side is an optional |1⟩ vertex (the abstract boundary vertex whose state can be inferred from parity can be considered as the sum of the left and right boundary vertices, so nothing need be determined about either of them individually). Therefore, the cluster 432*f* that has reached a boundary will not grow further because it has reached the boundary.

Figure 4D:
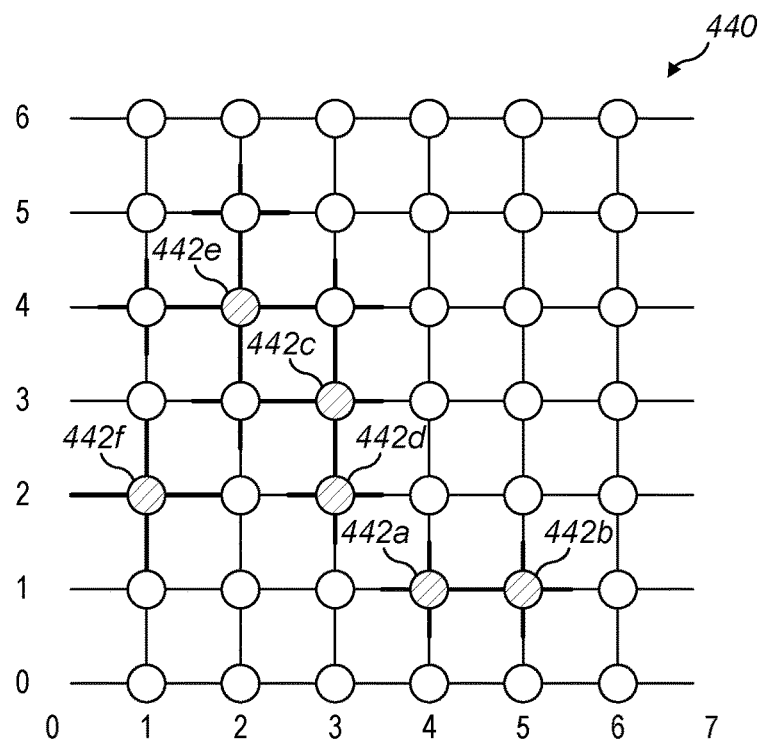

FIG. 4d shows a fourth graph 440 in which a remaining single vertex cluster 442e grows and merges to form an enlarged cluster also including the existing cluster 442c, 442d.

Figure 4E:
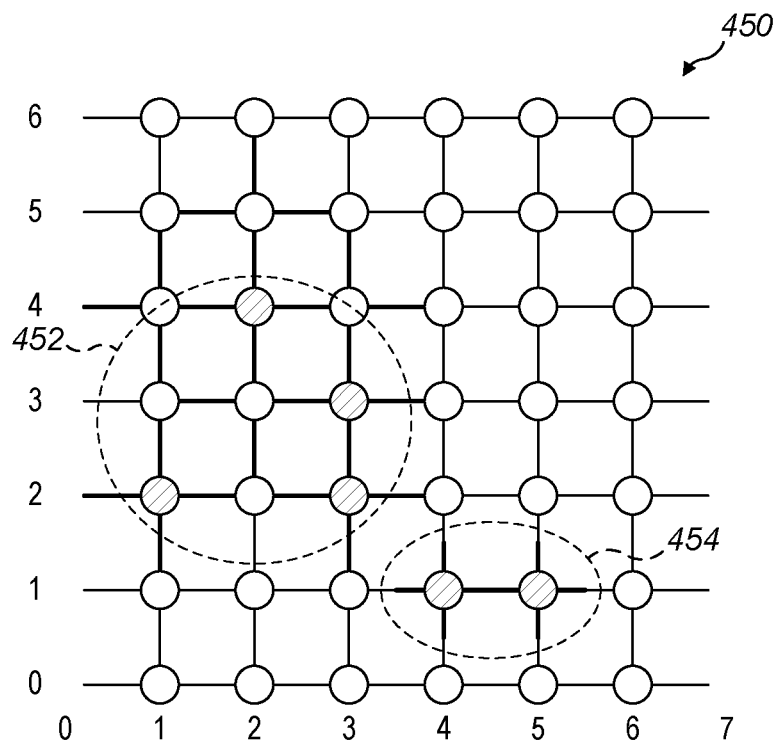

FIG. 4e shows a fifth graph 450 in which all |1⟩ vertices have been formed into a first even cluster 452 of exactly four |1⟩ vertices and a second even cluster 454 of exactly two |1⟩ vertices. The clustered vertices can now be decoded by any conventional means.

Figure 5:
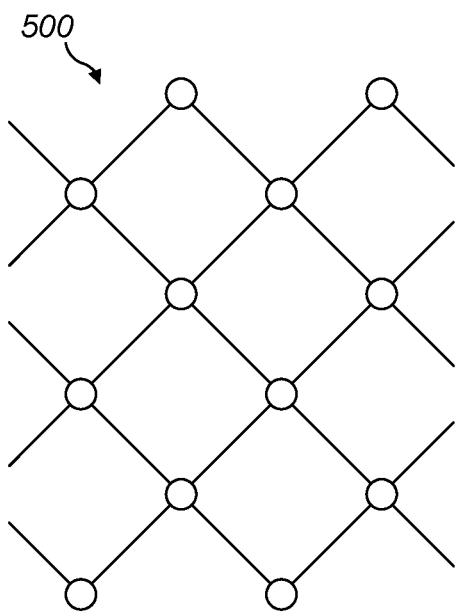
FIG. 5 shows an example of a rotated surface code patch.

The decoding methods and apparatus of the present disclosure can advantageously be used independently of the underlying graph. The graphs presented in FIGS. 4a-e, discussed above, are for the unrotated surface code. Other graphs for which this technique can be useful include the rotated surface code, such as that shown schematically by the graph 500 in FIG. 5.

Figure 6:
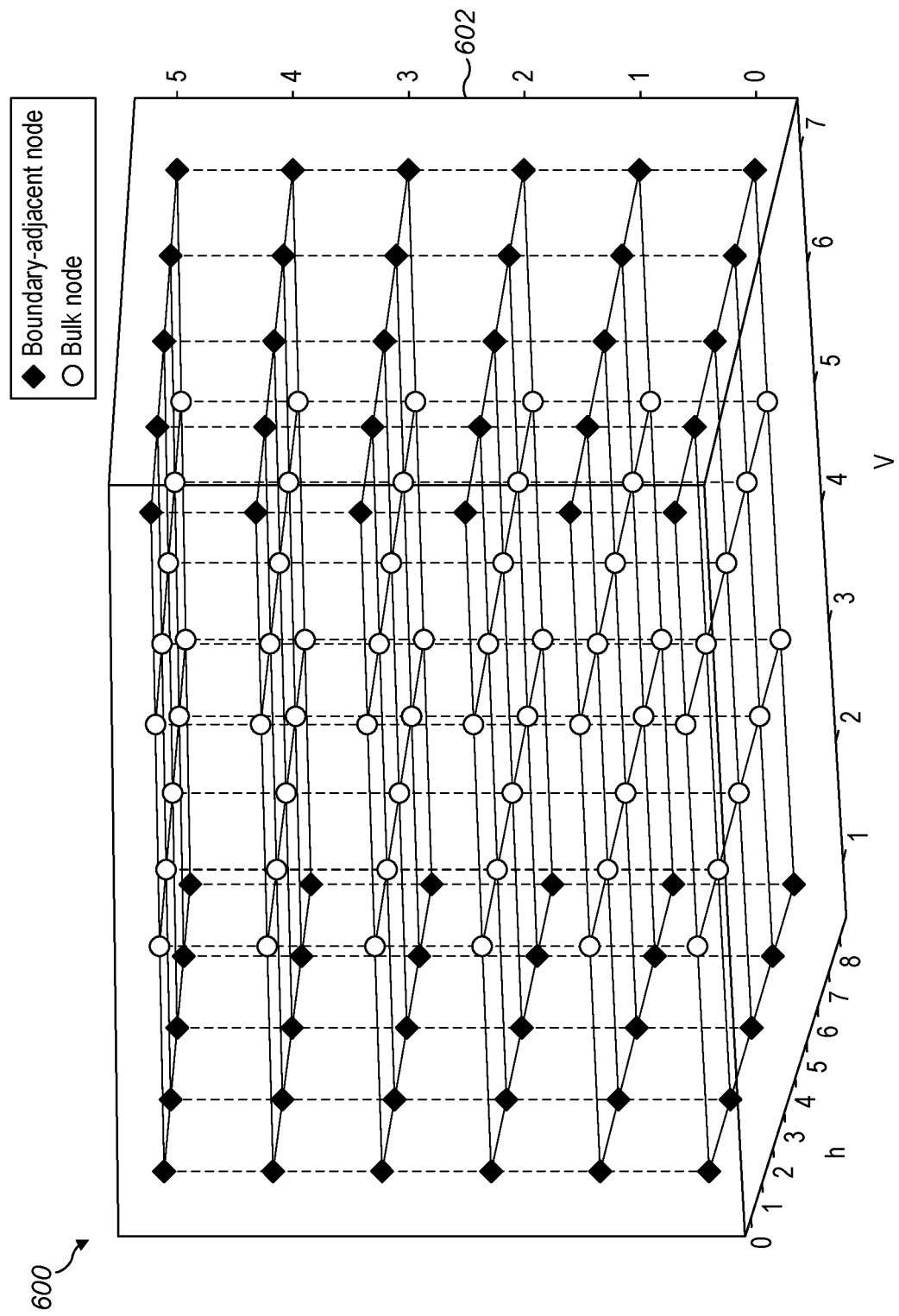
FIG. 6 shows an example of a 3D unrotated surface code graph with measurement noise.

FIG. 6 shows a three-dimensional version of the unrotated surface code 600, which includes multiple rounds of syndrome measurement to detect measurement errors. Each round occurs at a separate time and thus the surface code 600 in this case forms a spatio-temporal graph. Each round extends horizontally with successive rounds indexed on the vertical (time) axis 602 from 0 to 5. The syndrome extraction circuitry is otherwise assumed to be perfect in the sense of exhibiting "phenomenological noise" only.

Figure 7:
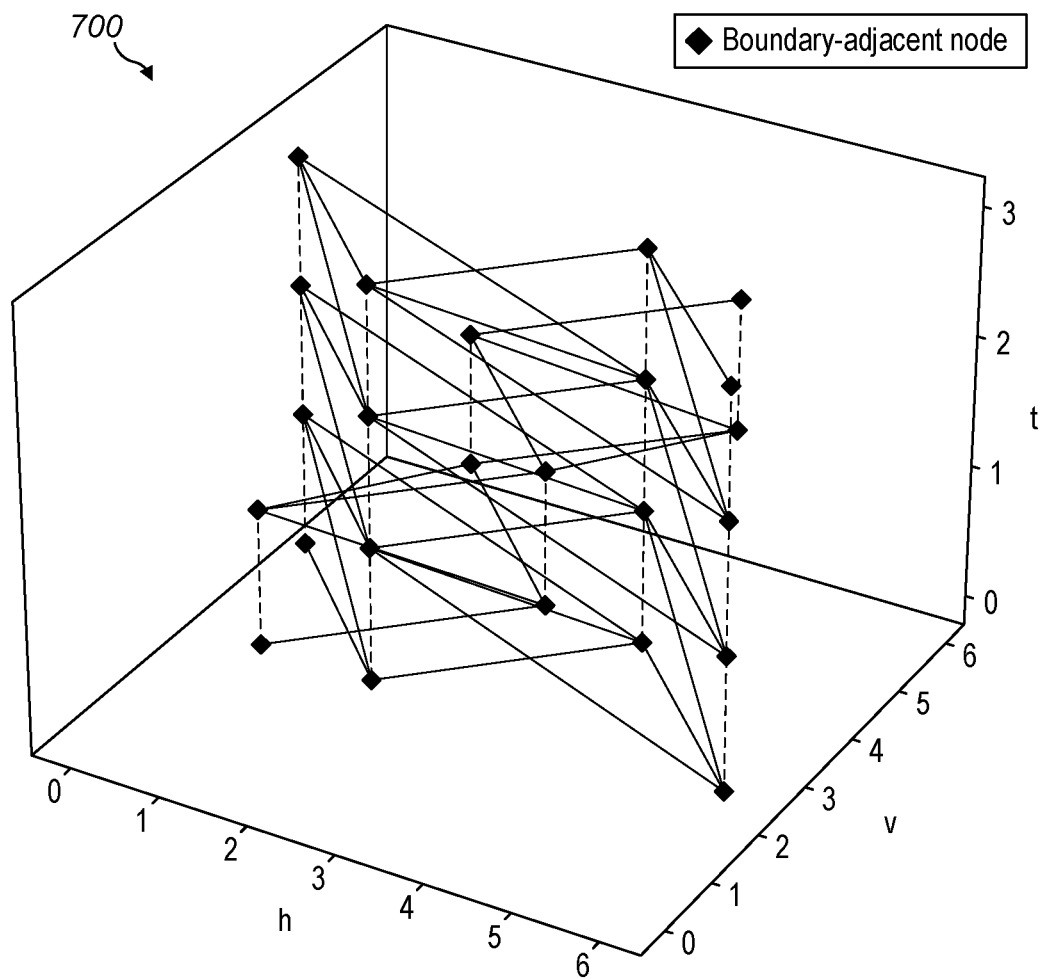
FIG. 7 shows an example of a 3D rotated surface code graph with full circuit level noise.

FIG. 7 shows a three-dimensional version of the rotated surface code that includes full circuit level noise 700. The diagonal edges represent other error processes that can be visible in the syndrome, e.g., "hook errors" arising from circuit-level noise, which is a noise model in which the errors introduced by the circuitry for measuring syndromes are included. Similar edges could be added to the graph in FIG. 6.

By default, the metric on a graph may define that all edges have length 1. However, it will be appreciated that different graph edges can have different lengths, which can represent the probability of an error being present on each edge. More likely error locations can be represented by shorter edges, such that the probability of those errors occurring may increase more rapidly. These variable weights could be represented by integers or floating point numbers. In all of these cases, decoders of the present disclosure and the associated methods can advantageously be employed to enable fault tolerant quantum computing to be implemented in practice.

The height and width of a decoding graph corresponds to the patch of physical qubits present in a quantum computer and will and determine the level of protection against (in traditional surface codes) X and Z errors, respectively. The depth corresponds to the number of measurement rounds to be decoded in a single batch, with larger number of rounds providing greater protection against measurement errors. These parameters can be varied without altering the fundamental repeating structure of the decoding graph. The resources required by a decoder scale with the volume, i.e. height times width times depth of the decoding graph.

A hardware decoder can implement decisions about resource usage at the design stage. Therefore, configuration at run-time can be difficult to achieve without damaging performance. The advantage of run-time configuration is that it allows re-use of decoding hardware across multiple qubit types/manufacturers and quantum algorithms, each of which might require a different shaped decoding problem to achieve the desired logical accuracy given their rates of physical noise. The re-sizing of a decoder discussed below provides a useful form of run-time configuration in which the height, width and depth of the computation to be performed can be varied.

Figure 8:
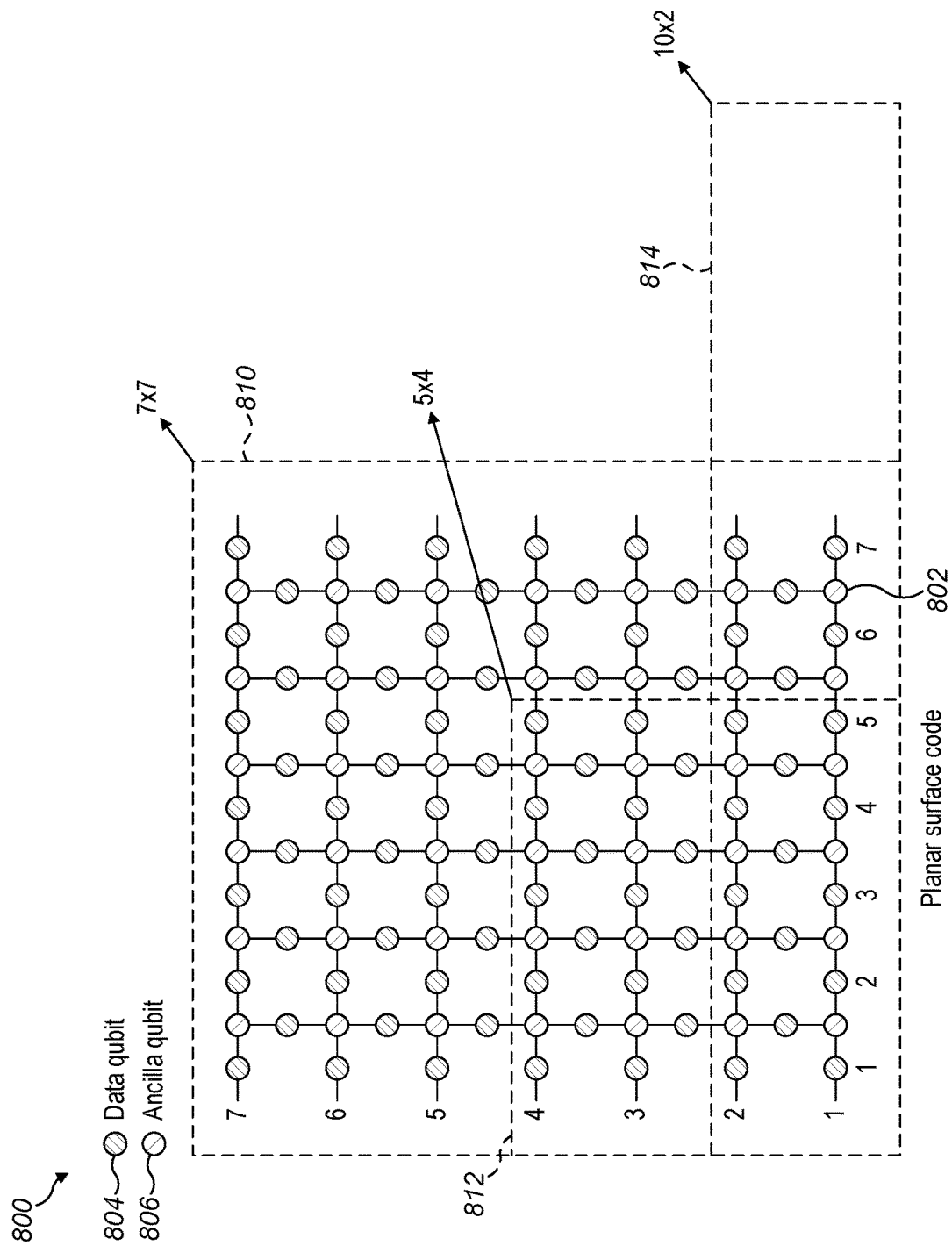
FIG. 8 shows an example embodiment of a qubit array that can generate surface code patches with multiple differently sized options for decoding surface code using a decoder of the present disclosure.

FIG. 8 shows a schematic representation 800 of a rectangular qubit array 802. It will be appreciated that more generally a qubit array may be rectilinear. The qubit array 802 is made up of a plurality of data qubits 804 and syndrome qubits 806 (which can also be described as ancilla qubits). The schematic representation 800 also shows three differing decoder dimensions that may be implemented using a decoder of the present disclosure: a 7×7 version 810 of the decoder, which would allow surface code patches generated by the whole qubit array 802 to be decoded; a 5×4 version 812 of the same decoder, which would allow surface code patches generated by only a subset of the qubit array 802 to be decoded; and a 10×2 version 814 of the same decoder that could be used to decode surface patches, from a different 10×2 qubit array, to be decoded.

Advantageously, this can enable a different selection of qubits to be used to undertake different computations, with the 5×4 version 812 enabling, for example, faster computation of simpler problems, or less error-prone problems, than the larger 7×7 version 810. It is also advantageous that the same decoder can be used in the 10×2 version 814 mode in conjunction with an alternative qubit array (not shown), such that a single manufacturing process can provide decoders for a wide variety of quantum computers, provided the overall number of qubits in any particular quantum computer does not exceed a maximum capacity of the decoder.

Generally, a decoder of the present disclosure can receive syndrome index data representative of both a physical location of each of the array of qubits within the quantum computer; and lattice dimensions of the array of qubits (the lattice dimensions indicating, for example, how many qubits there are in terms of the width, depth and height of a rectilinear array). The physical location of successive qubits can be a set of indices corresponding to an integer starting at zero for a first qubit and incrementing by one following any non-repeating path through the other qubits, non-repeating in that the path visits every qubit exactly once. To function, the decoder also needs to receive the syndromes of the quantum error correction code. As discussed below the decoder can then determine physical co-ordinate positions for each of the array of qubits based on the lattice dimensions and the indices of each qubit. The decoder can then decode the syndromes of the quantum error correction code using the determined physical co-ordinate positions, such as by using the clustering approach discussed below.

Generally, the decoder has a first syndrome capacity for decoding quantum error correction code syndromes, that is a maximum capacity for that decoder corresponding to the maximum number of syndrome qubits that the decoder can manage. Where the syndromes of the quantum error correction code occupy a second syndrome capacity that is less than or equal to the first syndrome capacity, then it will be possible to re-size the decoder to accommodate the syndromes, irrespective of the shape of the qubit array (in terms of height, width and optionally the depth of the array).

One possible way of implementing a re-sizeable decoder is to take any decoder for some maximum height, width and depth and allow edges to be given weight 0. When an edge is given weight 0 it will not be considered during the decoding, which effectively shrinks the graph to the desired size. This method will work for a variety of different decoding implementations.

Another highly advantageous decoding method that can be employed in conjunction with decoders of the present disclosure is described below in relation to FIGS. 9a-e.

Figure 9A:
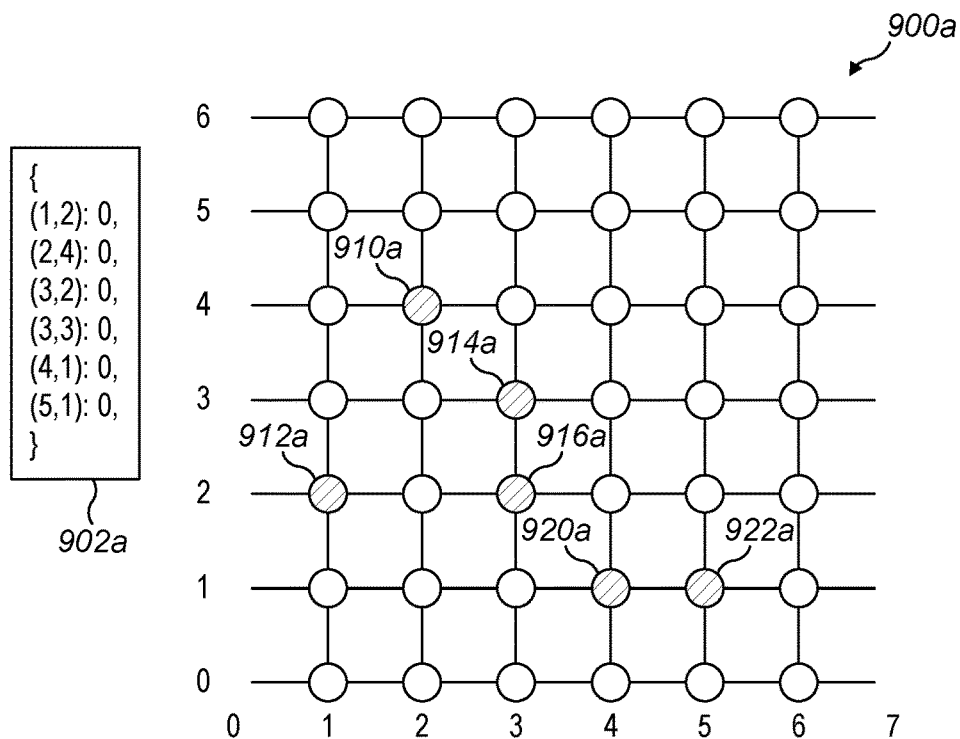
FIGS. 9a-e show an example embodiment of a decoding method applied to a surface code patch and the associated data structures.

FIG. 9a shows an unrotated surface code patch in graph form 900a and a corresponding data structure 902a. The graph shows the locations for |1⟩ vertices 910a, 912a, 914a, 916a, 920a, 922a (which are depicted as enlarged cross-hatched vertex dots). The data structure 902a records the location of each vertex, for example the first |1⟩ vertex 910a has location (2,4) in the graph. It will be appreciated that any system may be used to encode the location, such as a co-ordinate system that indexes the graph (as here) or any other co-ordinate system or any means of encoding values within any co-ordinate system. Further, in other examples, the location could refer to the actual physical location in 2- or 3-dimensional space of the relevant qubits.

The data structure 902a also records the radius of the ball surrounding each vertex, which in this initial state is 0 for all cases. Hence, for the first vertex 910a the data structure records the entry "(2,4):0" (the other |1⟩ vertices being recorded correspondingly).

FIGS. 9b-e show the evolution of the present cluster determination method as applied to the |1⟩ vertices illustrated in FIG. 9a.

Figure 9B:
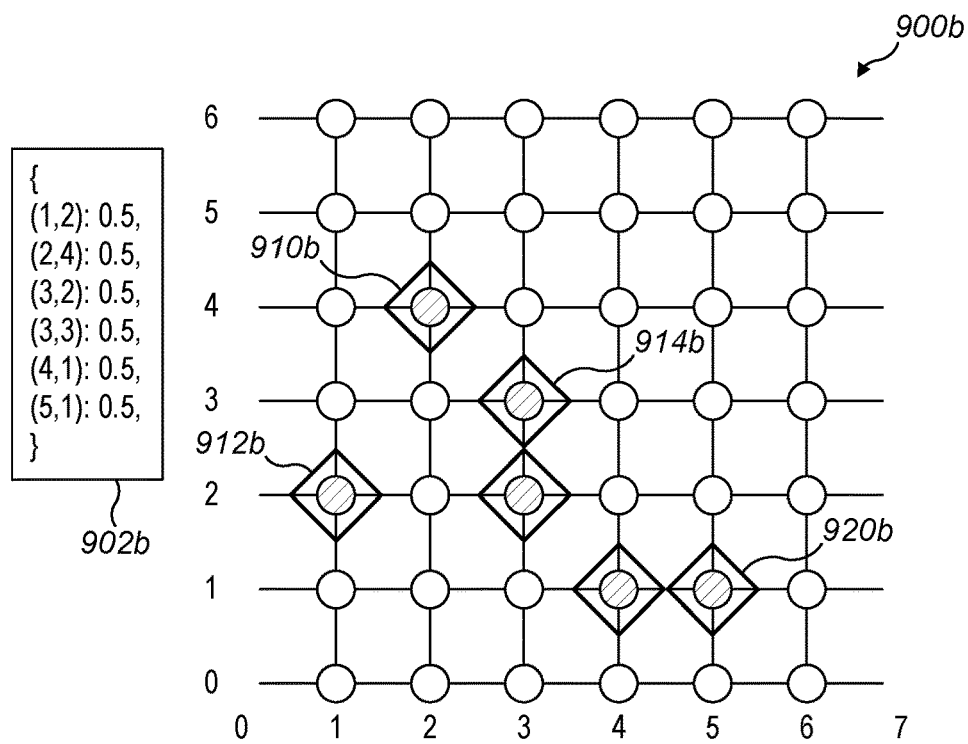

FIG. 9b shows a surface code patch 900b after a first iteration in which each cluster (of FIG. 9a) is grown by a single unit, corresponding to a half-edge of the graph. Each ball that surrounds each |1⟩ vertex is shown as a square shape as the norm used to define the shape of each ball is the $L_1$ norm on a vector space corresponding to the graph (which may equivalently be described as the graph metric on the square grid). (It will be appreciated that if the conventional Euclidean $L_2$ norm was used instead, then each ball would be circular, and further that the term 'ball' is used in its standard mathematical sense of being an N-dimensional region of an N-dimensional space or graph, the region being within a constant distance (or radius) from a single point, the distance measured using any appropriate norm defined on the N-dimensional space or graph.) After this first increase in radius the code patch 900b has four clusters: two single vertex clusters 910b, 912b and two (even) two-vertex clusters 914b, 920b. The associated data structure 902b records the location in the graph of each vertex around which each ball is constructed and its associated radius, which after only one iteration is 0.5 for each ball. The balls surrounding the vertices of the first two-vertex cluster 914b can be said to touch in this case as they coincide half way between vertex positions (3,2) and (3,3). In other examples, balls may instead overlap by coinciding throughout a finite volume rather than simply coinciding at a point, or as a further alternative they may meet along a line within a three-dimensional graph.

Figure 9C:
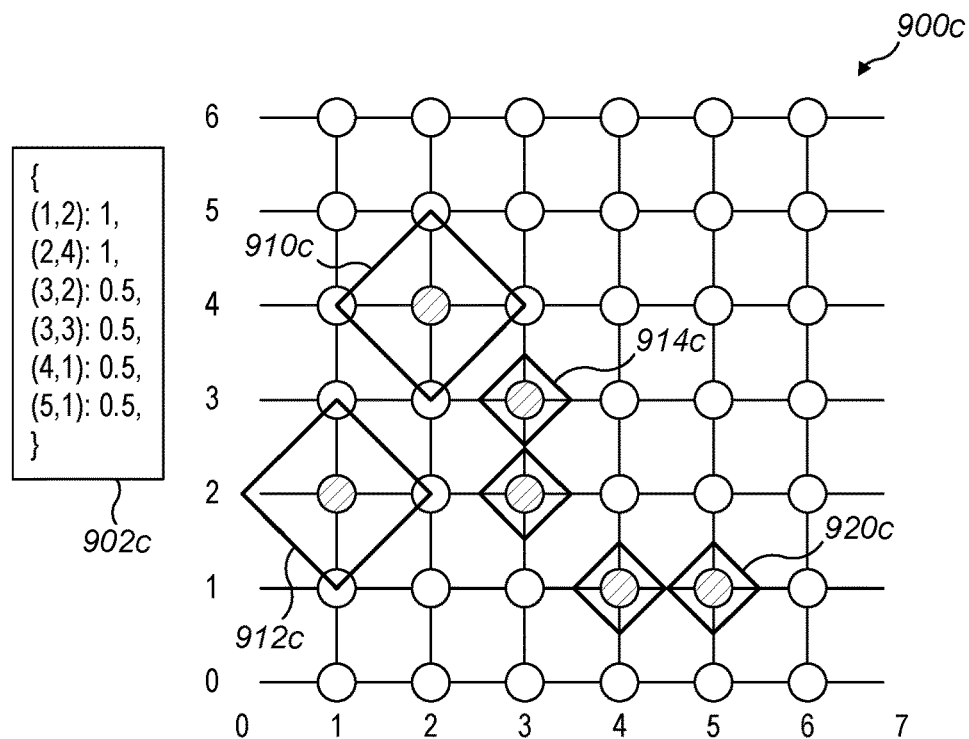

FIG. 9c shows the surface code patch 900c after a second iteration. The previously established even clusters 914c, 920c do not increase in radius. However, the single vertex clusters 910c, 912c both increase in radius to a length of 1. The number of clusters remains the same at this iteration and the data structure 902c records the state of the clusters.

Figure 9D:
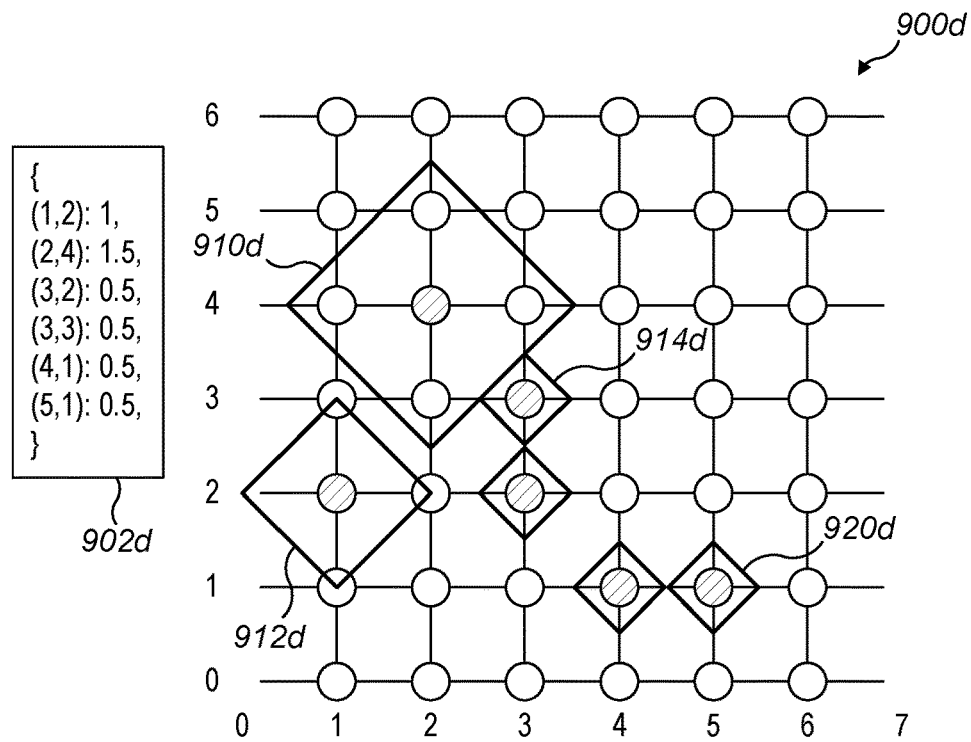

FIG. 9d shows the surface code patch 900d after a third iteration. The previously established even clusters 920d do not increase in radius but the previous single vertex cluster 910d increases in radius to 1.5 and thereby form an odd-cluster of three |1⟩ vertices with the formerly even two-vertex cluster 914d. Conversely, the single vertex cluster 912d does not increase in size as it has reached the boundary of the graph at co-ordinate 0,2 and will, similarly, not increase in future iterations for the same reason.

Figure 9E:
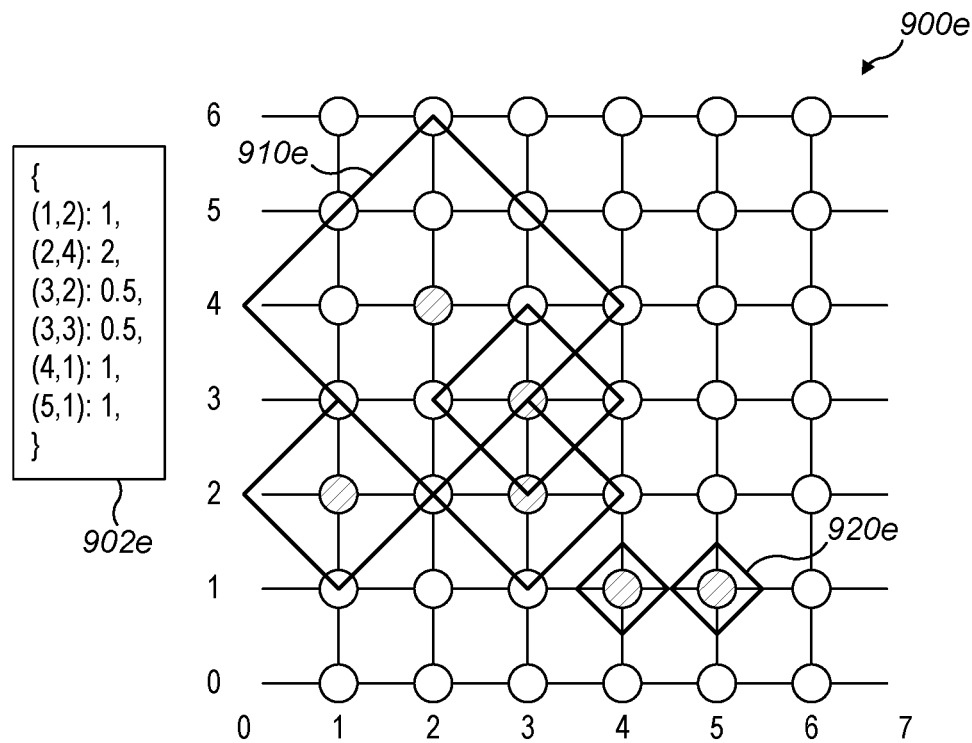

FIG. 9e shows the surface code patch 800e after a fourth iteration. Each vertex ball of the former three-vertex cluster has increased in radius by a half-edge resulting in a single cluster 910e of exactly four vertices. The previously formed two-vertex cluster 920e remains unchanged. This completes the clustering process by forming all |1⟩ vertices into even clusters, the locations and geometries of which are efficiently recorded in the associated data structure 902e. The data structure 902e can now be used to decode the syndromes of the quantum error correction code, that is the surface code patch 900e, by any suitable method, which can ultimately enable the performance of quantum error correction.

The standard union-find data structure is an efficient way to represent the current state of a sequence of merge operations on an initial set of objects, here the initial single-vertex clusters. To update, or determine, in which cluster a vertex belongs, such standard union-find data structures can be used. The Clustering Union-Find data structures disclosed herein 902a-e can efficiently represent the internal structure of the clusters.

Any Union-Find type decoding algorithm can move back and forth between updating the standard union-find data structure and the Clustering Union-Find data structure. Thus, these two data structures evolve together in parallel, each informing how the other should change at each step.

It will be appreciated that, as a matter of generality, if a single, or any odd number of |1⟩ vertices join an existing even cluster, then that newly formed cluster will have an odd number of |1⟩ vertices and consequently all of the balls surrounding the vertices of that newly formed odd-cluster will increase in radius at the next iteration (apart from any ball that has already reached a boundary).

The memory requirement of the present cluster representation scales with the number of |1⟩ vertices in the syndrome, and not with the number of syndrome qubits, as per previous representations. Consequently, the effect of using this representation is to provide a more efficient data structure to store information about the shape of clusters. This advantageously enables simplification of hardware used to implement a decoder of the present disclosure based on this data structure. This simplification of hardware improves performance, lowers memory requirements and enables parallelism by reducing contention to memory, which all provide clear technical advantages for performing fault-tolerant quantum computing.

The flexibility of this decoding method makes it possible to solve any problem up to some maximum volume (or number of syndrome qubits), rather than bounding each dimension separately. That is, the only limitation is based on the maximum number of entries allows in the cluster list data-structure. The dependence on syndrome weight also allows the additional trade-off of being able to solve larger problems at lower error rates or smaller problems at higher error rates.

In some examples, the syndromes of the quantum error correction code include a plurality of rounds of error correction undertaken at intervals of time corresponding to clock cycles of the quantum computer. Advantageously, at different times and thus different parts of a computation the syndrome index data may have different respective lattice dimensions for different respective sets of rounds of error correction, such as where lattice surgery is performed. Decoders of the present disclosure can process such decoding situations with advantageously improved efficiency.

Figure 10:
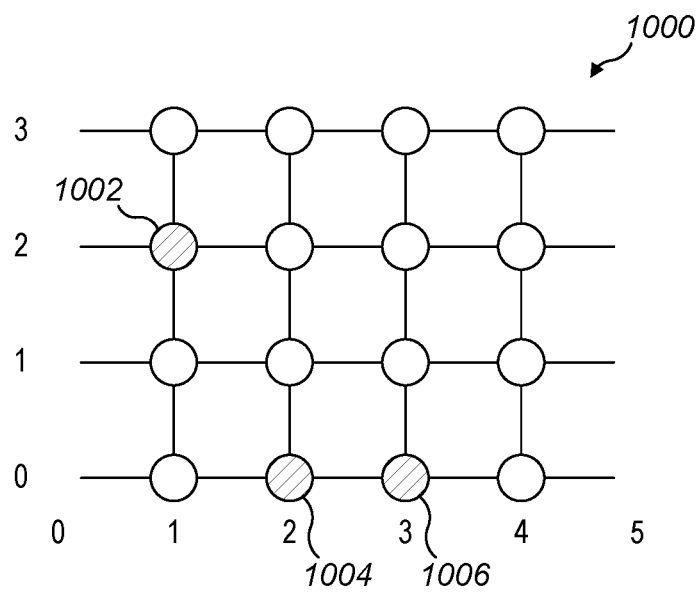
FIG. 10 shows an example embodiment of a first surface code patch containing errors that can be decoded by a decoder of the present disclosure.

FIG. 10 shows a planar surface code patch 1000 with a horizontal dimension of 5 and a vertical dimension of 4 that has defects at vertex positions (1,2) 1002 (2,0) 1004 and (3,0) 1006. The decoding is described below in conjunction with FIG. 11.

Figure 11:
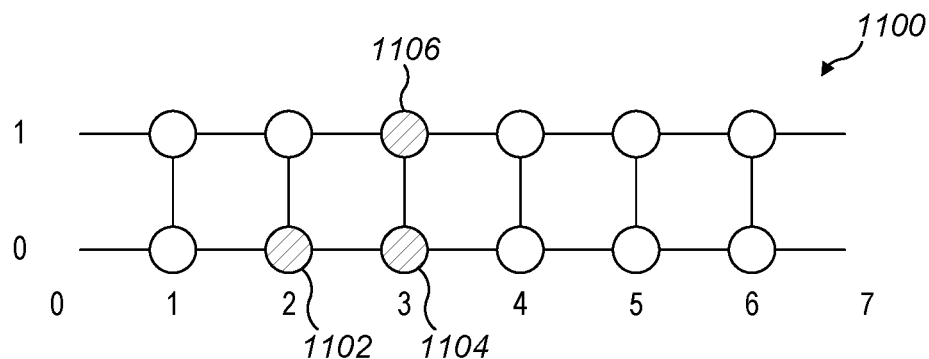
FIG. 11 shows an example embodiment of a second surface code patch containing errors, that has different dimensions than the first surface code patch of FIG. 10 that can also be decoded by a decoder of the present disclosure.

FIG. 11 shows a planar surface code patch 1100 with a horizontal dimension of 7 and a vertical dimension of 2 that has defects at vertex positions (2,0) 1102 (3,0) 1104 and (3,1) 1106.

In both FIGS. 10 and 11, the dimensions of the lattices can be represented by two variable h (representing first horizontal lattice dimension) and v (representing a second vertical lattice dimension). The decoder input includes a syndrome index list, having a length, where the list is a series of index values, one unique index value for each vertex of the array. In one example, the index value can start at 0 for the position at the bottom left hand corner (co-ordinate 0,0) and increment by one for each vertex going from left to right for each row, and going from bottom to top to include all the rows. This part of the decoder input (the syndrome index list) for the surface patch of FIG. 10 would therefore be "0110000010000000" which can be represented as indices [1,2,8] corresponding to the defect positions, counting from zero at the beginning of the input stream. Correspondingly for the surface patch of FIG. 11, the decoder input would be "011000001000", which can also be represented as indices [1,2,8]. The indices for both surface patches are therefore the same.

However, the lattice dimensions for these surface code patches are different, specifically, when represented as (h,v) the lattice dimension for the surface code patch of FIG. 10 are (5,4) while the lattice dimension for the surface code patch of FIG. 11 are (7,2).

Given the decoder input and the lattice dimensions it is possible to determine the physical co-ordinate positions of the defects, since the qubits form a rectangular array, in the following way. A first (horizontal) co-ordinate value (x) is determined by computing a sum of one and the index position (i) of the defect modulo the difference between the horizontal dimension value h and one:

$$x=(i \bmod(h-1))+1$$

The second (vertical) co-ordinate value (y) for each respective defect, corresponds to the second (vertical) lattice dimension, by computing an integer quotient of the index position (i) divided by the difference between the horizontal dimension value h and one:

$$y=i//(h-1)$$

When applying this method to the decoder input for FIG. 10, the co-ordinates recovered are (1,2), (2,0) and (3,0), which are different than those for the decoder input of FIG. 11, namely (2,0), (3,0) and (3,1), since although the indices for both cases are the same, the (h,v) the lattice dimension are different. The lattice dimensions also provide information about the boundary of the surface code patch, which by convention, with open boundaries, correspond to x=0 and x=h for planar surface code patches.

It will be appreciated that this approach can be extended to three-dimensional qubit arrays by including an additional lattice dimension value corresponding to a third physical dimension mutually orthogonal to the horizontal and vertical dimensions discuss above.

It will also be appreciated that any systematic method can be used to assign qubits index values, not only a numbering that proceeds left to right and bottom to top, with consequential changes for the formulae required to convert the index values and lattice dimensions into the physical positions of the relevant qubits.

Figure 12:
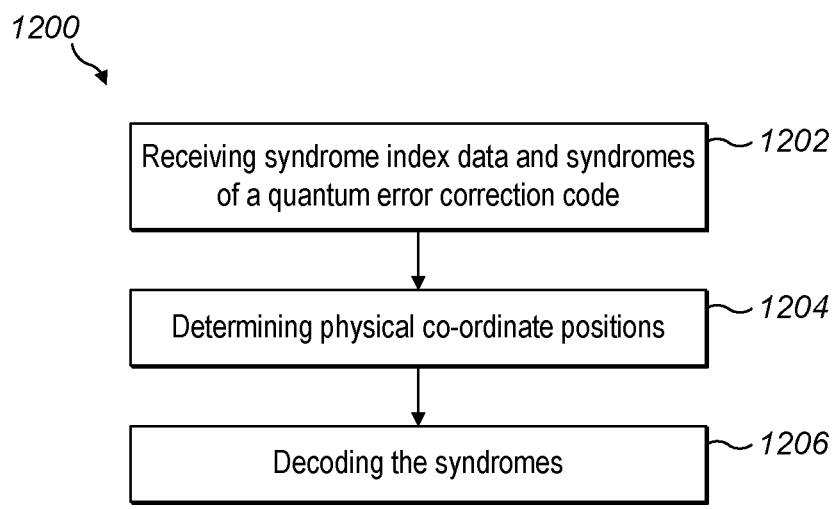
FIG. 12 shows an example embodiment of a method for use in decoding syndromes of a quantum error correction code.

FIG. 12 shows a flow chart 1200 of a method for use in decoding syndromes of a quantum error correction code. In a first step 1202, syndrome index data is received that is representative of both a physical location of each of the array of qubits within the quantum computer and the lattice dimensions of the array of qubits. Further, the actual syndromes of the quantum error correction code are also received. Then, at a second step 1204, the physical co-ordinate positions for each of the array of qubits are determined from the syndrome index data, as described above in relation to FIGS. 10 and 11. In a third step 1206, the syndromes of the quantum error correction code are decoded using the physical co-ordinate positions determined at the previous step.

It will be appreciated from the above discussion that the syndromes occupy a second syndrome capacity less than or equal to a first syndrome capacity, where the first syndrome capacity is the maximum capacity of the decoder performing the present method.

Figure 13:
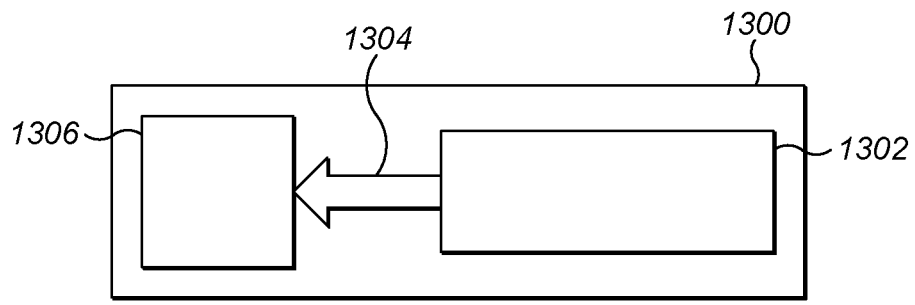
FIG. 13 shows an example embodiment of a quantum computer system.

FIG. 13 shows a quantum computer system 1300, having a quantum processor unit (QPU) 1302 which contains a plurality of data and syndrome qubits. The quantum computer system 1300 also has a decoder 1306 according to the present disclosure. The QPU 1302 generates syndrome data 1304 which is sent to the decoder 1306, for decoding. The decoding can include processing of the syndrome data 1304 as described herein, to generate the data structure required to enable efficient decoding for quantum error correction. The decoder can re-size to undertake different computations using different subsets of the qubits of the QPU 1302, as may be advantageous. The quantum computer system 1300 can therefore be configured to execute quantum error correction to enable fault tolerant quantum computing.

Figure 14:
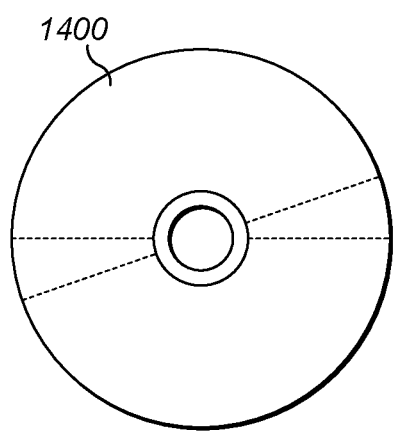
FIG. 14 shows an example embodiment of a computer program product.

FIG. 14 shows an example computer program product 1400 that contains instructions which, when executed, cause an apparatus, as described in FIG. 13, to at least perform steps of any method described above. Equivalently, there may also be provided a computer readable memory medium corresponding to the computer program product 1400.

The invention claimed is:

1. A decoder apparatus for decoding syndromes of a quantum error correction code, the syndromes of the quantum error correction code comprising measurement data from a quantum computer, the quantum computer comprising an array of qubits including syndrome qubits and data qubits, the decoder apparatus configured to:
   receive syndrome index data representative of:
      a physical location of each of the array of qubits within the quantum computer; and
      lattice dimensions of the array of qubits;
   receive the syndromes of the quantum error correction code from the quantum computer;
   determine physical co-ordinate positions for each of the array of qubits based on the syndrome index data;
   decode the syndromes of the quantum error correction code using the determined physical co-ordinate positions; and
   wherein:
      the decoder apparatus has a first syndrome capacity for decoding the syndromes of the quantum error correction code; and
      the syndromes of the quantum error correction code occupy a second syndrome capacity less than or equal to the first syndrome capacity of the decoder apparatus.

2. The decoder apparatus of claim 1, wherein the array of qubits is rectilinear.

3. The decoder apparatus of claim 2, wherein the syndrome index data comprises:
   a syndrome index list including a series of index values, one unique index value for each respective syndrome qubit of the array of qubits; and
   the lattice dimensions comprising a first value for a first lattice dimension and a second value for a second lattice dimension, wherein the first lattice dimension is orthogonal to the second lattice dimension.

4. The decoder apparatus of claim 3, wherein the array of qubits is rectangular and the decoder apparatus is configured to determine the physical co-ordinate positions by:
   determining a first co-ordinate value for each respective syndrome qubit, corresponding to the first lattice dimension, by computing a sum of one and the respective index value modulo a difference between the second value and one; and
   determining a second co-ordinate value for each respective syndrome qubit, correspond to the second lattice dimension, by computing an integer quotient of the respective index value divided by the difference between the second value and one.

5. The decoder apparatus of claim 3, wherein the lattice dimensions further comprise a third value for a third lattice dimension orthogonal to both the first lattice dimension and the second lattice dimension.

6. The decoder apparatus of claim 2, wherein the quantum error correction code is a planar surface code.

7. The decoder apparatus of claim 1, wherein the syndromes of the quantum error correction code comprise a plurality of rounds of error correction.

8. The decoder apparatus of claim 7, wherein the syndrome index data comprises a plurality of different respective lattice dimensions for different respective sets of rounds of the plurality of rounds of error correction.

9. The decoder apparatus of claim 1, wherein the decoder apparatus is configured to set decoder edges to a weight value of zero for a first region bounding a second region, the second region corresponding to dimensions of the syndromes of the quantum error correction code.

10. The decoder apparatus of claim 1, wherein the decoder apparatus is configured to:
    process the syndromes of the quantum error correction code to identify defects;
    record, in a data structure, respective locations for each of the defects; and
    determine a respective radius, for each respective defect of the defects, of a ball surrounding the respective location of the respective defect, and record each respective radius with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of the defects;
    wherein the data structure thereby enables decoding of the quantum error correction code.

11. The decoder apparatus of claim 10, wherein when at a particular iteration an odd number of the locations join a pre-existing cluster consisting of an even number of locations thereby forming a new cluster, at the next iteration the processor is configured to increase the length of each radius of the new cluster.

12. The decoder apparatus of claim 10, wherein the length of a particular radius is determined based on a number of times that the particular radius has been incrementally increased.

13. The decoder apparatus of claim 10, wherein the syndrome qubits form a physical array with locations of the syndrome qubits corresponding to respective positions of the syndrome qubits in a graph representation of the array.

14. The decoder apparatus of claim 13, wherein each iterative increase in the length of the respective radius is an increase of half the graph length between nearest neighbor locations of the graph.

15. The decoder apparatus of claim 13, wherein the touching or overlapping of the ball with the other ball is determined based on the sum of the radius length of the ball and the radius length of the other ball being at least equal to the graph distance between the ball and the other ball.

16. The decoder apparatus of claim 10, wherein the decoder apparatus is further configured to decode each of the one or more clusters to determine the location and type of error present on each data qubit containing an error.

17. The decoder apparatus of claim 16, wherein the decoder apparatus is further configured to perform error correction for each data qubit containing an error.

18. A quantum computer system comprising the decoder apparatus of claim 10, the quantum computer system configured to decode the one or more clusters and to perform quantum error correction.

* * * * *